United States Patent Office

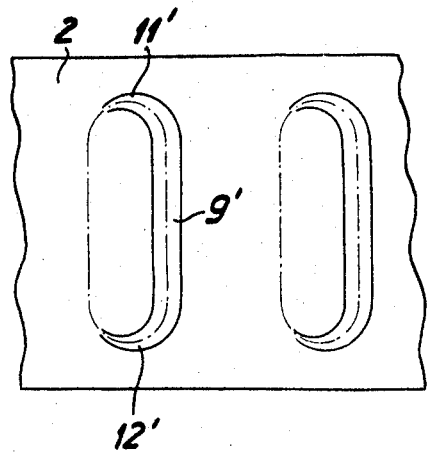

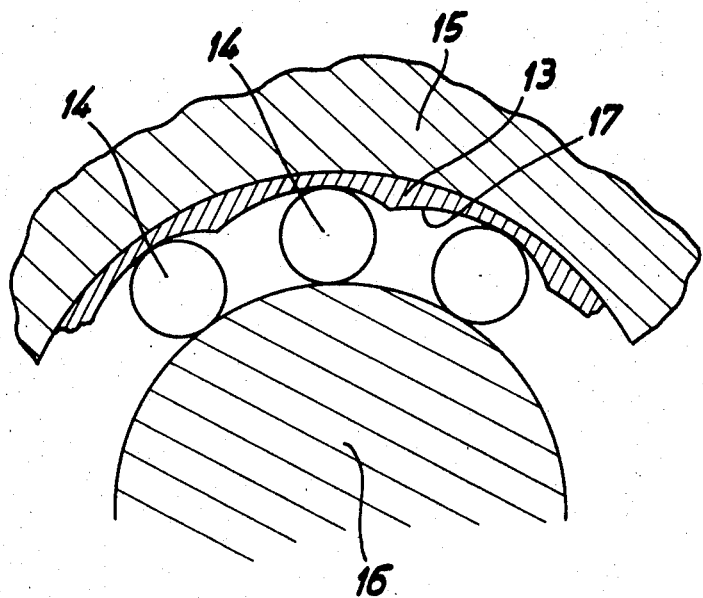

3,565,494
Patented Feb. 23, 1971

3,565,494
CYLINDRICAL SLEEVE FOR BEARINGS
Leo Linz and Georg Schaeffler, Herzogenaurach, Germany, assignors to Industriewerk Schaeffler OHG, Herzogenaurach, Germany
Filed Jan. 7, 1969, Ser. No. 789,548
Claims priority, application Germany, Jan. 12, 1968, P 16 75 057.5; Sept. 14, 1968, P 17 77 169.6
Int. Cl. F16c 26/06
U.S. Cl. 308—6   5 Claims

ABSTRACT OF THE DISCLOSURE

A method of producing thin-walled cylindrical sleeves adapted for use in bearings and provided with profiles and to the novel sleeves produced by the said process.

PRIOR ART

Bearing sleeves provided with profiles are used as outer or inner races of expanding, overrunning grip roller clutches or as races for ball bearings used to mount shafts having a longitudinal motion. Known methods for the preparation of such bearing sleeves have started with a cylindrical piece of pipe which was profiled by machining or by punching in the case of the ball bearing sleeves which are expensive and require cumbersome equipment.

OBJECTS OF THE INVENTION

It is an object of the invention to provide a novel simplified method for the preparation of thin-walled sleeves adapted for use in bearings and provided with profiles about its circumference.

It is another object of the invention to provide an improved sleeve, provided with profiles adapted for use in bearings.

These and other objects and advantages of the invention will become obvious from the following detailed description.

THE INVENTION

The novel method of the invention for the preparation of a thin-walled sleeve provided with profiles and adapted for use in bearings comprises impressing profiles into a smooth steel ribbon by material compression and bending the profiled steel ribbon into a cylindrical sleeve. The cylindrical sleeve may be welded along its abutment or at both ends, if desired, or by other means.

The profiling of the smooth steel ribbon does not cause any problems particularly since the profiles in most cases can be impressed in multiples. The making of the profiling effects a further very desirable compaction and cold strengthening of the material used which achieves running and wear properties equal to that known while using a lower grade material than before. By forming the profile by compacting, a completely smooth, uniform profile surface having excellent bearing properties is obtained.

Referring now to the drawings:

FIG. 5 is a partial view of the inner circumference of another embodiment of the invention analogous to the embodiment of FIG. 3; and FIG. 6 is a partial cross section through a grip overrunning roller clutch with an outer race produced by the method of the invention.

Figure 1:
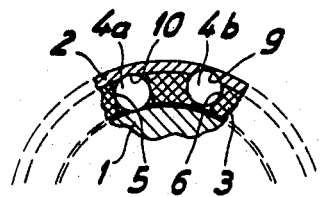
FIG. 1 is a partial cross section through a ball bearing embodiment of the invention for mounting shafts having longitudinal motion produced by the method of the invention.
Figure 2:
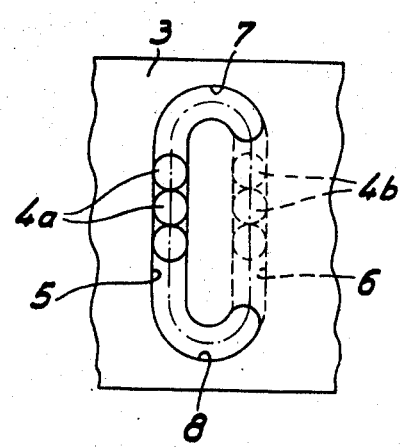
FIG. 2 is a partial view of the inner circumference of the ball bearing of FIG. 1.

The embodiment illustrated in FIGS. 1 to 4 is a ball bearing for mounting of a shaft 1 having a longitudinal movement. The bearing is comprised of a thin-walled, exteriorally smooth cylindrical race 2 and a guide sleeve 3 arranged in concentric relation thereto, which is provided with a plurality of ball guides distributed about its circumference for balls 4a and 4b. Each of the ball guides which are shown in FIG. 2 consists of a linear guiding zone 5 for moving balls under load, a linear guiding zone 6 parallel to zone 5 for moving balls not under load and two semicircular guiding zones 7 and 8 connecting guiding zones 5 and 6. Guide zone 5 and semicircular guide zones 7 and 8 are formed as a passing-through longitudinal slot having a width slightly less than the ball diameter and guide zone 6 is formed as a groove which opens only toward the outer circumference of guide sleeve 3. Preferably, guide seleve 3 is made of plastic material and the cylindrical race or sleeve 2 is made of steel.

Figure 3:
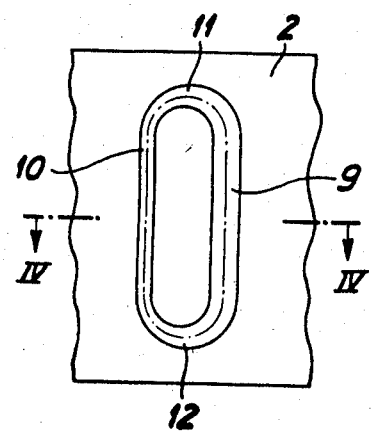
FIG. 3 is a partial view of the inner circumference of the race sleeve of FIG. 1.
Figure 4:
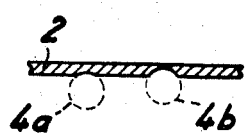
FIG. 4 is a cross section taken along the line IV—IV of FIG. 3.

As shown in FIGS. 3 and 4, the running sleeve or race which is formed as a cylinder with a smooth outer circumference from a continuous bend has on its inner circumference enclosed, compressed ball raceways. Each ball raceway consists of one deep, linear raceway 9 for balls 4b not under load, a shallow linear raceway for balls 4a under load and two approximately semicircular raceways 11 and 12 connecting linear raceways 9 and 10.

The preparation of race or sleeve 2 comprises impressing ball raceways 9 to 12 into a smooth, thin-walled steel ribbon, bending the resulting ribbon into a cylindrical sleeve and welding the abutting edges, if desired.

During operation of the assembled ball bearing, balls 4a which are moved in guide zone 5 of the ball guides of guide sleeve 3 and run on raceway 10 of enclosed ball raceway of race or sleeve 2, are under load and thus move shaft 1 longitudinally. Balls 4b which are moved in guide zone 6 and run on raceway 9 of sleeve or race 2 are not under load and have no contact with the circumference of shaft 1.

While the embodiment of FIGS. 1 to 4 illustrates a bearing in which the inner circumference is provided with enclosed, impressed ball raceways, FIG. 5 illustrates a variation in which only raceway 9' for the balls not under load and semicircular connecting raceways 11' and 12' are impressed into the inner circumference of the thin-walled steel ribbon which is then bent into a cylindrical sleeve.

In the embodiment of FIG. 6, the grip overrunning clutch has a thin-walled sleeve 13 as the outer race in which grip rollers 14 are arranged. The said clutch is installed between machine part 15 and shaft 16. On the inner circumference of sleeve or race 13, grip profiles or camming surfaces 17 are provided so that rollers 14 will allow shaft 16 to turn in one direction, but in the other direction there is a nonrotational connection between machine part 15 and shaft 16.

The sleeve or race 13 is produced from a smooth steel ribbon into which camming surfaces 17 are impressed with campaction of the material. Then, the steel ribbon is bent into a cylindrical sleeve or race 13 which can be welded along its abutting edges or at its ends. The grip rollers 14 may also be arranged in a cage within the sleeve 13.

Various modifications of the process of manufacture of the sleeve or race of the bearings of the invention may be made without departing from the spirit or scope thereof.

We claim:

1. A ball bearing for the mounting of shafts having longitudinal movement, comprising a thin-walled, steel outer race having a smooth exterior and ball raceways impressed on its inner circumference consisting of regularly spaced longitudinal profiles and semicircular profiles connecting two of said longitudinal profiles and a guide sleeve arranged in concentric relation with the race having a plurality of ball guides distributed about its circumference, the ball guides consisting of two linear guiding zones running parallel to the bearing axis and two semicircular guiding zones connecting the linear guide zones with one linear guiding zone for guiding balls under load formed as a passing-through longitudinal slot with a width slightly less than the ball diameter and the other linear guiding zone formed as a groove open only toward the circumference of the guide sleeve.

2. A method of manufacturing a bearing sleeve for mounting of a shaft having longitudinal movement from steel ribbon comprising impressing regularly spaced longitudinal profiles and curved profiles joining at least one of said longitudinal profiles into one side of a steel ribbon while maintaining a smooth surface on the other side of said ribbon, said longitudinal profiles providing a varying thickness of said ribbon in longitudinal direction and bending the profiled steel ribbon into a cylindrical sleeve having a smooth outer surface.

3. The method of claim 2 wherein the cylindrical sleeve is welded along its abutment.

4. A method of preparing a thin-walled outer race for grip roller overrunning clutches provided with profiled camming surfaces comprising impressing regularly spaced longitudinal profiles into one side of a steel ribbon while maintaining a smooth surface on the other side of said ribbon, said profiles providing a varying thickness of said ribbon in longitudinal direction and bending the profiled steel ribbon into a cylindrical sleeve having a smooth outer surface whereby the longitudinal profiles act as camming surfaces for grip rollers.

5. A race for ball bearings for mounting a shaft having longitudinal movement comprising a thin-walled, cylindrical steel sleeve having a smooth outer surface and provided about its inner circumference with profiled, enclosed ball raceways impressed into the cylindrical sleeve, said raceway having a deep linear ball raceway portion for balls not under load, a parallel, shallow ball raceway portion for balls under load and two shallow semicircular ball raceway portions connecting the said parallel raceways.

References Cited

UNITED STATES PATENTS

| | | | |
|---|---|---|---|
| 2,509,749 | 5/1950 | Thomson | 308—6 |
| 3,229,353 | 1/1966 | Morrison | 29—148.4 |

FOREIGN PATENTS

| | | | |
|---|---|---|---|
| 730,849 | 3/1964 | Canada | 39—148X |

FRED C. MATTERN, JR., Primary Examiner